(12) United States Patent
Schulz

(10) Patent No.: US 8,082,820 B2
(45) Date of Patent: Dec. 27, 2011

(54) FASTENING SYSTEM

(75) Inventor: Lars Schulz, Elze (DE)

(73) Assignee: Kongsberg Automotive, Kongsberg (NO)

( * ) Notice: Subject to any disclaimer, the term of this patent is extended or adjusted under 35 U.S.C. 154(b) by 928 days.

(21) Appl. No.: 12/073,814

(22) Filed: Mar. 11, 2008

(65) Prior Publication Data

US 2008/0222858 A1 Sep. 18, 2008

(30) Foreign Application Priority Data

Mar. 17, 2007 (DE) .................... 20 2007 003 950 U
Jul. 13, 2007 (DE) .......................... 10 2007 033 079

(51) Int. Cl.
*F16C 1/10* (2006.01)
*F16H 61/36* (2006.01)

(52) U.S. Cl. .................... 74/502.4; 248/56; 248/74.1
(58) Field of Classification Search .................. None
See application file for complete search history.

(56) References Cited

U.S. PATENT DOCUMENTS 5,596,908 A    1/1997    Hall

FOREIGN PATENT DOCUMENTS

| DE | 19840642 C2 | 7/2002 |
|---|---|---|
| EP | 1026411 B1 | 1/2000 |
| EP | 1114937 B1 | 12/2000 |
| EP | 1291536 A1 | 9/2001 |
| WO | WO 2004/070236 | * 2/2003 |

* cited by examiner

*Primary Examiner* — Jack W. Lavinder
(74) *Attorney, Agent, or Firm* — Baker & Hostetler LLP

(57) ABSTRACT

A fastening system for axial fastening of an elongated element with a snap-on fastener to a support, in which the snap-on fastener encloses the elongated element, has a retaining ring with an internal spring and can be inserted by means of a groove into the U-shaped recess in a support and in the fixed state, the retaining ring acts by means of a spring against the support, in order to counteract axial loosening of the snap-on fastener. A support with at least one deep groove relative to the surface of support around the U-shaped recess, a snap-on fastener with an internal spring, which can be adjusted in the direction toward groove, and whose retaining ring has a face, whose shape corresponds to the shape of the groove of the support.

9 Claims, 4 Drawing Sheets

FASTENING SYSTEM

PRIORITY

This application claims priority of German patent application DE102007033079.2 filed Jul. 13, 2007 and of German patent application DE202007003950.6 filed Mar. 17, 2007, the contents of both applications are incorporated herein by reference in their entireties.

FIELD OF THE INVENTION

The invention concerns a fastening system for axial and radial fastening of an elongated element corresponding to the preamble of the first claim.

BACKGROUND OF THE INVENTION

The invention is applicable anywhere elongated elements, for example, cables or control cables, must be quickly and simply connected to a support and released again, high lateral forces occur on the cable and high reliability against unintended loosening of the cable is supposed to exist. This can be the case, in particular, in operating cables, control cables or cables of vehicles. Such control cables, cables or operating cables generally consist of a largely pressure-resistant sheath in the longitudinal extent of the cable, which, however, is bendable across its longitudinal extent. This is generally accomplished by a steel band coiled into a tube. The coiled tube is ordinarily provided with a plastic coating, in order to avoid entry of moisture and dirt into the sheath of the cable, and to protect the steel band coil from corrosion. The sheath can also be molded with plastic. A wire, the so-called core, is ordinarily guided within the sheath, which is movable lengthwise relative to the sheath. The operating cables are used to transfer tensile or compressive forces to a limited extent, in which operating paths are transferred. Operating cables can be used to operate brakes and gearshifts of vehicles, hood releases, for throttle valve operation or clutch operation and others. Such operating cables are flexibly laid, so that forces and paths can be transferred mechanically in simple fashion even in poorly reachable locations. Ordinarily, the elongated elements are fastened by means of a snap-on fastener to the desired location in a support. Different supports are known for this purpose. The present invention describes the snap-on fastener with a retaining ring, which is connected in a support with a U-shaped recess.

A device for fastening an elongated element is known from EP 1 291 536 A1, in which the elongated element is enclosed with a central body over part of its longitudinal extent and the central body is fastened in a U-shaped holder with a radially arranged groove, according to which a spring element, which is provided with a corresponding device, engages in a recess of the holder. Since the central body of the elongated element consists essentially of one part, the elastic flange element snaps into the holder with the U-shaped recess and is fastened with it.

EP 1 114 937 B1 describes a device for fastening of an elongated body, especially a control cable sheath, to a support, in which a U-shaped recess is present, into which the support element, which encloses the sheath of the flexible cable, snaps in by means of an engagement part that has a groove. Locking occurs in additionally applied notches of the U-shaped receptacle by means of snap closures.

U.S. Pat. No. 5,596,908 A describes a U-shaped profile for a support element with a slit, which is situated on the lower end of the U-shaped profile. A fastener, which is arranged around a cable, can be pushed into it, locking occurring by means of a pin arranged laterally next to the U-shaped slit.

DE 198 40 642 C2 describes a fastening element for an operating cable that can be inserted into a U-shaped support, recesses being arranged on the upper end of the U-shaped support, in which locking of the fastening element can occur.

EP 1 026 411 B1 describes an anchoring device for anchoring an elongated component in a flat component with a slit leading to one edge with a sleeve that can be fastened axially around the elongated component and is designed with a peripheral groove. A protrusion is arranged on the flat component, which locks into a ring that can assume different positions. This solution, however, requires that the difference between the groove and the U-shaped slit be as small as possible, so that a durable connection is produced and the sleeve cannot slide relative to the slit. Bending moments on the cable in the direction toward the opening of the U-shape of the slit can lead to a situation, in which a gap forms between the sleeve and the flat component, which can result in unintended loosening of the component from the anchoring. The protrusion present on the flat component must also be overcome by additional retraction of the sleeve and therefore with a higher force during insertion of the snap-on fastener, so that the ring snaps in behind the protrusion.

The solutions existing according to the prior art have either a complicated design with a number of parts or are not very suitable for quickly and reliably fastening a snap-on fastener with a retaining ring and mechanical spring in its interior in a support with a U-shaped recess and an additional fastening capability.

SUMMARY OF THE INVENTION

It is therefore the task of the invention to develop a fastening system for axial and radial fastening of an elongated element with a snap-on fastener with a retaining ring and mechanical spring in its interior, which can be quickly and reliably fastened in a support with a U-shaped recess, without a lateral force effect permitting a position change of the retaining ring or a force effect from below leading to loosening of the connection.

One aspect includes a fastening system for axial fastening of an elongated element with a snap-on fastener to a support, in which the snap-on fastener encloses the elongated element, and a retaining ring with an internal spring which can be inserted by means of a groove into the U-shaped recess of a support and in the fastened state of the retaining ring to bias against the support, in order to counteract loosening of the snap-on fastener, the support has at least one deep groove relative to a surface of support around the U-shaped recess. The spring can be adjusted in the direction toward groove, and wherein the retaining ring has a face having a shape that corresponds to the shape of the groove of the support.

One embodiment provides a fastening system for axial and radial fastening of an elongated element with a snap-on fastener with retaining ring and mechanical spring in its interior in a support with a U-shaped recess and an additionally fastening possibility for the snap-on fastener, in which the support with the U-shaped recess and at least one deep groove relative to the surface of the support is provided around the U-shaped recess.

The deep groove is arranged at the side of the support, into which the axial face of a spring-loaded retaining ring engages in the fixed state. For this purpose, the snap-on fastener can be moved by means of the internal spring in the direction toward the groove, in which case the shape of the face corresponds to the axial shape of the groove of the support.

The solution according to the invention permits rapid and reliable fastening of elongated elements, for example, a cable on a support.

The snap-on fastener is retracted against the axial force of the spring, so that the groove is free and the snap-on fastener can be radially introduced into the U-shaped recess of the support. The retaining ring can then be released and pushed on the surface of the support, until the face of the retaining ring snaps into the groove of the support. This has the advantageous that the installing person need only retract the retaining ring briefly. As long as the retaining ring is pushed on the plane of the support, an equivalent spring force lies is present during further insertion of the snap-on fastener into the U-shaped recess, through which the face of the retaining ring snaps into the groove when both forms coincide. This is the case as soon as the snap-on fastener has reached roughly the base of the U-shaped recess. Locking is therefore automatically ensured when the snap-on fastener has reached the prescribed position in the support. Incorrect operations during fastening of a cable can thus be largely ruled out.

The advantage is also provided in that lateral shifting of the snap-on fastener within the U-shaped recess can no longer occur, even when there is a large diameter difference between the manufactured or worn connection. A bending moment of the cable, acting in the direction toward the opening of the U-shaped recess, does not lead to loosening of the snap-on fastener, but to a firm connection, since the face is forced more deeply into the groove in the upper area of the support. Retraction of the retaining ring over the protrusion against the action of the spring force for fastening and holding of the retaining ring is no longer required either. Automatic locking occurs in the precisely prescribed position without retraction of the retaining ring.

It is advantageous, if the retaining ring can be retracted by an amount corresponding to double the depth of the groove of the support. It is also advantageous to make the groove around the U-shaped recess round or circular.

The fastening system can have a number of recesses on a circle around the U-shaped recess, in which the face of the retaining ring is provided with a number of protrusions that match the recesses arranged in a circle. It is advantageous, if the protrusions, as well as the individual recesses, have areas of adjacent inclined surfaces separated from each other, so that the protrusions automatically engage in the recesses in each rotational position of the retaining ring.

The shape of the face of the retaining ring in the axial direction can be made smooth, saw-tooth, conical, semicircular or rectangular, in which the shape of the groove is made accordingly. In order to achieve a particularly firm connection, it can be advantageous to arrange several faces in several circular grooves that match each other.

Depending on the use conditions, it can be advantageous to make the support and the retaining ring and its face from plastic, or to make both the support and the retaining ring and its face from steel and aluminum.

If the groove and face of the retaining ring are designed smooth and circular, this has the advantage that the rotational position of the retaining ring is fully without influence on reliable mounting of the snap-on fastener on the support.

If the face and groove have a different shape, for example, saw-tooth, conical, semicircular or rectangular, radial forces can be taken up by the connection. In order to be independent from the rotational position of the retaining ring in such a solution, the protrusions or separators can be provided with slopes that ensure independent centering and therefore engagement of the protrusions in the recesses during insertion of the snap-on fastener.

DESCRIPTION OF THE DRAWINGS

The invention will be explained below in a practical example and four figures.

The figures show.

DETAILED DESCRIPTION

Figure 1:
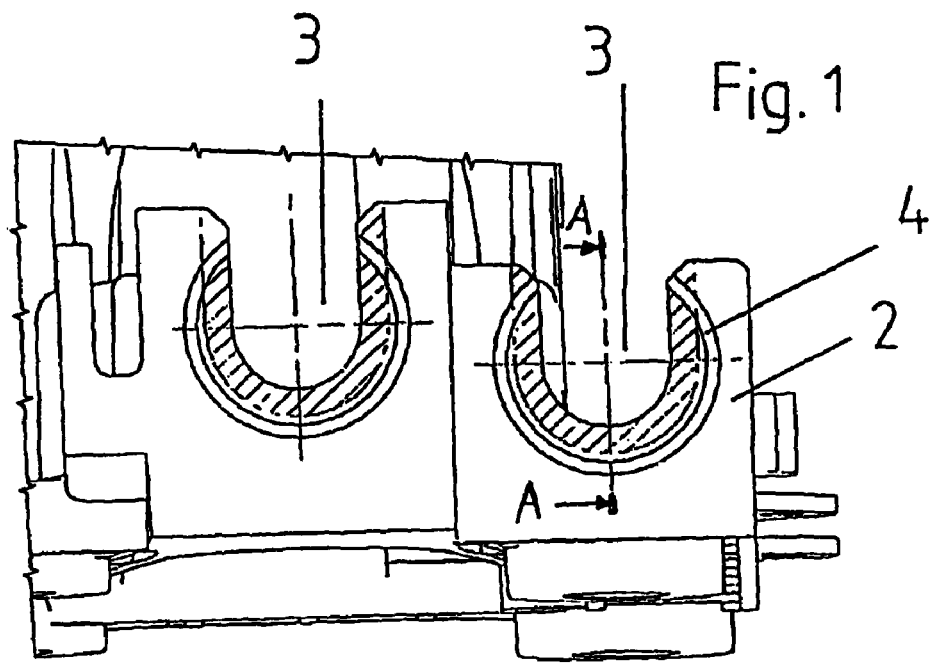
FIG. 1: Support with U-shaped recess and circular groove

FIG. 1 shows the support 2 with the U-shaped recess 3 and the circular groove 4 to accommodate a snap-on fastener 1 in a front view.

Figure 2:
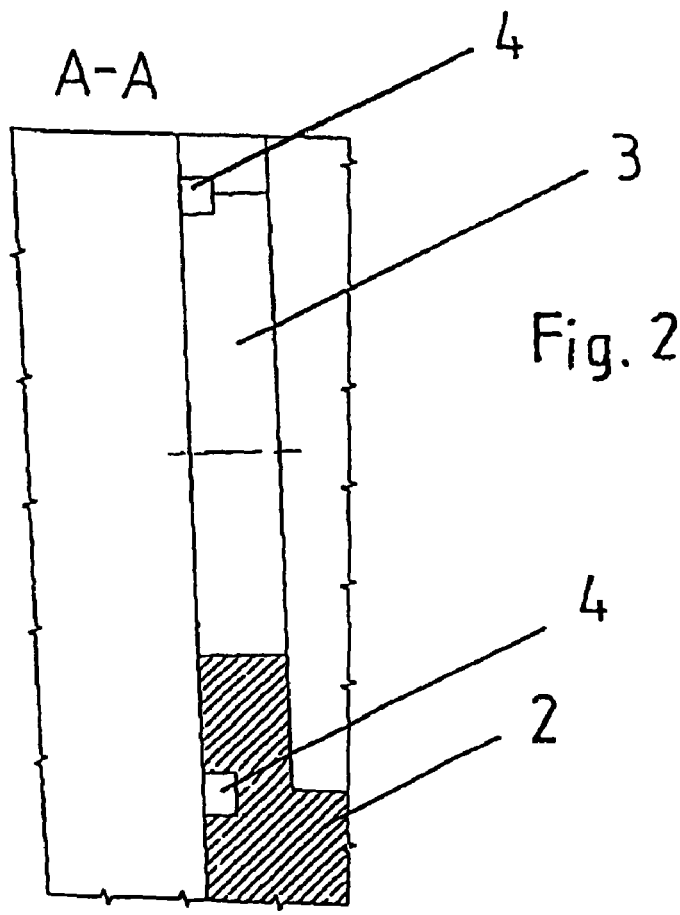
FIG. 2: Section A-A of FIG. 1

FIG. 2 shows section A-A through support 2, in which the U-shaped recess 3 and the cut circular groove 4 and the end of the circular groove 4 can be seen in the lower part of the figure.

Figure 3:
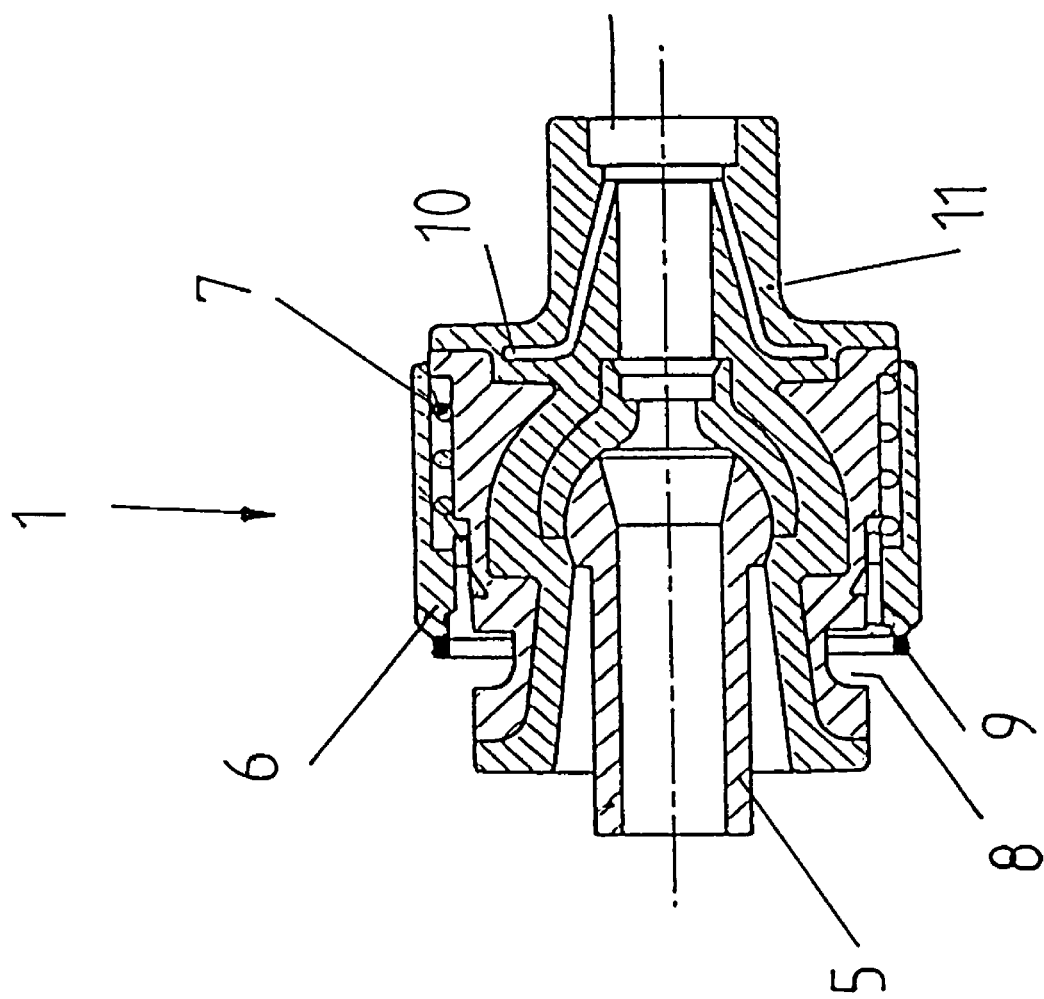
FIG. 3: Snap-on fastener with retaining ring, mechanical spring and groove
Figure 4:
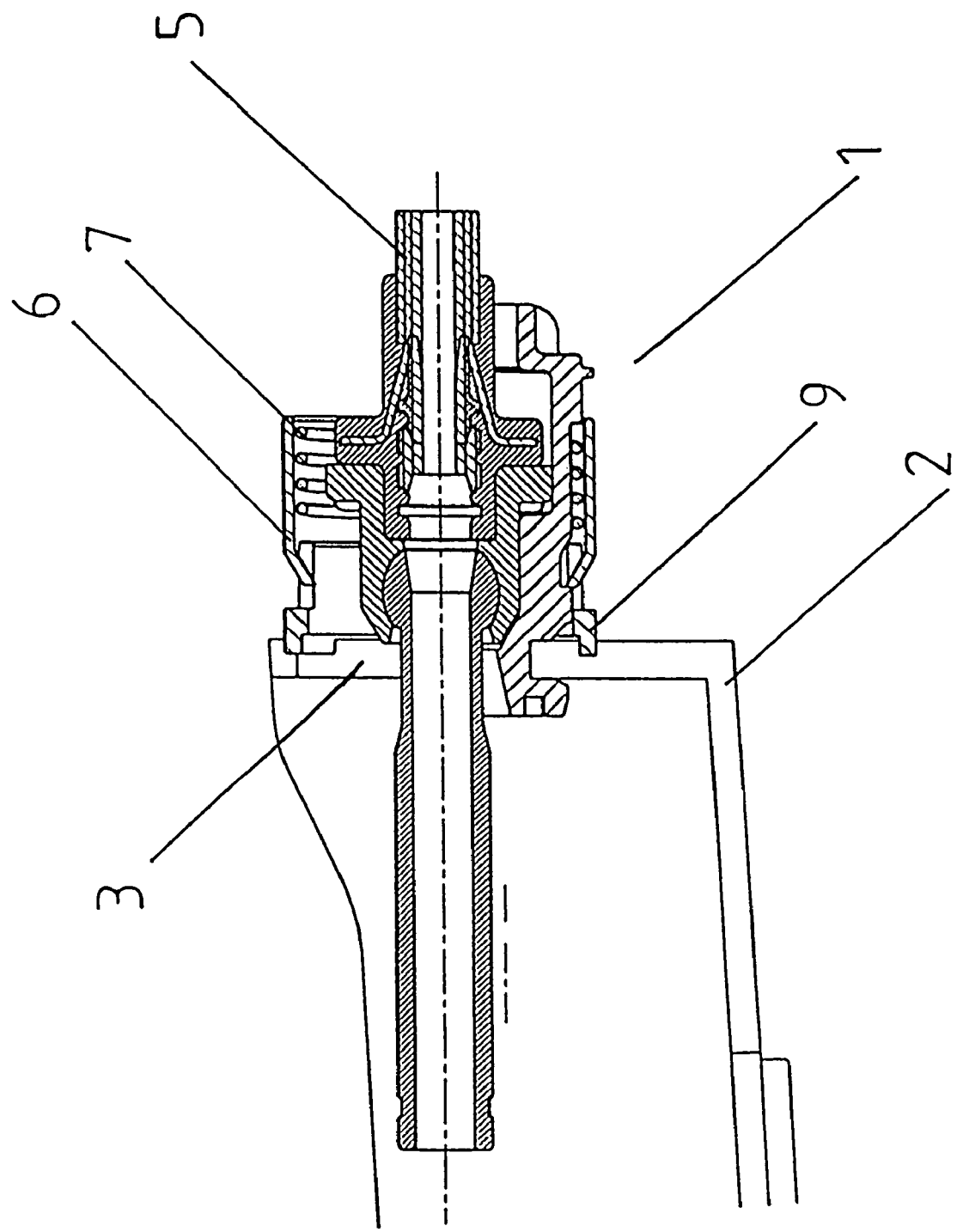
FIG. 4: Snap-on fastener in section, in which the face of the retaining ring engages in the circular groove of the support

FIG. 3 shows the snap-on fastener 1, which forms the end of a longitudinal cabling 10 with hard component 11 of the elongated element 5. The inner spring 7 of the snap-on fastener 1 presses the retaining ring 6 of the specification and its face 9 over the groove 8 of the snap-on fastener 1, so that it is partly covered. If the snap-on fastener 1 is now to be fastened to the support 2, it is sufficient to just slightly retract the retaining ring 6 against the resistance of the internal spring 7 and to insert the snap-on fastener 1 by means of groove 8 into the U-shaped recess 3 of support 2. The retaining ring 6 can then be released by the installing person, so that, on reaching the end position, the face 9 of the retaining ring 6 snaps into the circular groove 4 of support 2. The elongated element 5 is therefore fastened reliably to support 2 by means of snap-on fastener 1, which is shown in FIG. 4.

Figure 5:
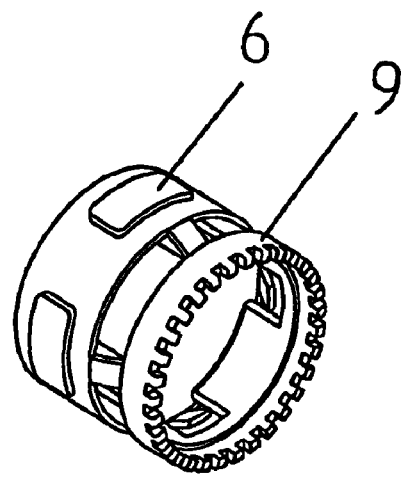
FIG. 5: Retaining ring with polygonal face
Figure 6:
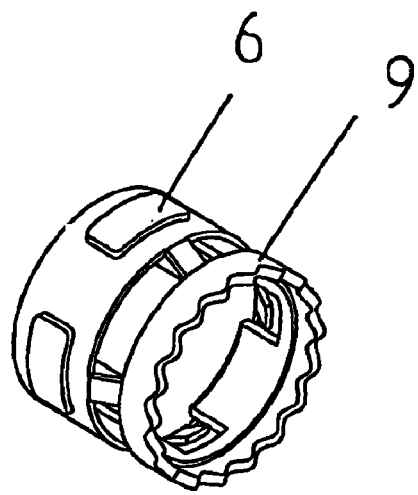
FIG. 6: Retaining ring with wave-like face
Figure 7:
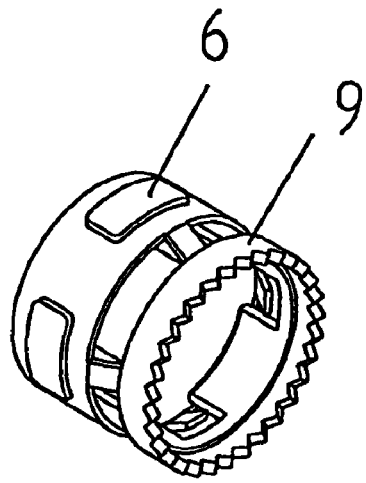
FIG. 7: Retaining ring with a saw-tooth-shaped face

FIGS. 5 to 7 show retaining rings 6 with differently designed faces 9, FIG. 5 showing a face 9 that is designed polygonal, in which the length of each tooth is the same as the subsequent gap.

FIG. 6 shows a retaining ring 6, whose face 9 is designed wave-like, whereas FIG. 7 shows a retaining ring 6, whose face 9 has a saw-tooth shape. The shape of the circular groove 4 has the same arrangement of recesses, so that centering of the face 9 relative to the circular groove 4 occurs and rotation of the retaining ring 6 relative to support 2 cannot occur.

Lateral shifting of the snap-on fastener within the U-shaped recess can no longer occur, even with a larger diameter difference between the manufactured or worn connection. A bending moment of the cable, acting in the direction toward the opening of the U-shaped recess, does not lead to loosening of the U-shaped fastener, but to a firm connection, since the face in the upper region of the support is forced more deeply into the groove. Retraction of the retaining ring over the protrusion against the action of the spring force for fastening and holding of the retaining ring is also no longer necessary. Automatic locking occurs in the precisely prescribed position without retraction of the retaining ring.

What is claimed is:

1. A fastening system for axial fastening of an elongated element with a snap-on fastener to a support, in which the snap-on fastener encloses the elongated element, comprising:

a retaining ring with an internal spring which can be inserted by means of a groove into the U-shaped recess of the support and in the fastened state of the retaining ring to bias against the support, in order to counteract loosening of the snap-on fastener, the support has at least one deep groove relative to a surface of support around the U-shaped recess;

and the spring can be adjusted in the direction toward groove, and wherein the retaining ring has a face having a shape that corresponds to the shape of the groove of the support wherein a number of recesses are arranged on a circle around the U-shaped recess, and the face of the retaining ring is provided with a number of protrusions matching the recesses arranged in circular fashion.

2. Fastening system according to claim 1, wherein the retaining ring can be retracted by an amount corresponding to double the depth of groove.

3. Fastening system according to claim 1, wherein the groove is designed circular around the U-shaped recess.

4. Fastening system according to claim 1, wherein the face of the retaining ring is designed smooth and corresponds to the shape of groove.

5. Fastening system according to claim 1, wherein the protrusions, as well as the individual recesses, have areas of adjacent inclined surfaces separated from each other, so that the protrusions automatically engage in the recesses in each rotational position of the retaining ring.

6. Fastening system according to claim 1, wherein the shape of the face is saw-toothed, conical, wave-like, semicircular or rectangular, and the radial shapes of the groove are made accordingly.

7. Fastening system according to claim 6, wherein several faces and several grooves matching them are arranged.

8. Fastening system according to claim 6, wherein both the support and the retaining ring and its face consist of plastic.

9. Fastening system according to claim 6, wherein both the support and the retaining ring and its face consist of steel or aluminum.

* * * * *